(12) United States Patent
Morin et al.

(10) Patent No.: US 10,169,828 B1
(45) Date of Patent: Jan. 1, 2019

(54) METHOD AND SYSTEM FOR APPLYING ANALYTICS MODELS TO A TAX RETURN PREPARATION SYSTEM TO DETERMINE A LIKELIHOOD OF RECEIVING EARNED INCOME TAX CREDIT BY A USER

(71) Applicant: Intuit Inc., Mountain View, CA (US)

(72) Inventors: Yao H. Morin, San Diego, CA (US); Massimo Mascaro, San Diego, CA (US); Preetam Kumar Ojha, Poway, CA (US); Joel R. Minton, La Jolla, CA (US)

(73) Assignee: Intuit Inc., Mountain View, CA (US)

( * ) Notice: Subject to any disclaimer, the term of this patent is extended or adjusted under 35 U.S.C. 154(b) by 549 days.

(21) Appl. No.: 14/813,022

(22) Filed: Jul. 29, 2015

(51) Int. Cl.
*G06Q 40/00* (2012.01)
(52) U.S. Cl.
CPC .................. *G06Q 40/123* (2013.12)
(58) Field of Classification Search
CPC ............................ G06Q 40/123; G06Q 40/103
See application file for complete search history.

(56) References Cited

U.S. PATENT DOCUMENTS

| | | | |
|---|---|---|---|
| 6,922,488 B2 | 7/2005 | Mastrianni et al. | |
| 6,973,418 B1 | 12/2005 | Kirshenbaum | |
| 7,788,137 B1 | 8/2010 | Tifford | |
| 7,797,166 B1 * | 9/2010 | Bradley | G06Q 40/00 705/1.1 |
| 8,090,794 B1 | 1/2012 | Kilat et al. | |
| 8,190,499 B1 | 5/2012 | McVickar | |
| 8,407,113 B1 | 3/2013 | Eftekhari et al. | |
| 8,490,018 B2 | 7/2013 | Carter et al. | |
| 8,768,313 B2 | 7/2014 | Rodriguez | |
| 8,806,444 B1 | 8/2014 | Podgorny et al. | |
| 9,355,650 B2 | 5/2016 | Dimitriadis et al. | |
| 9,378,065 B2 | 6/2016 | Shear et al. | |
| 9,444,824 B1 | 9/2016 | Balazs et al. | |
| 9,648,171 B1 | 5/2017 | Eftekhari et al. | |
| 9,891,792 B1 | 2/2018 | Morin et al. | |
| 9,983,859 B2 | 5/2018 | Mascaro et al. | |
| 2002/0152457 A1 | 10/2002 | Jahnke | |
| 2006/0155632 A1 | 7/2006 | Cherkas et al. | |

(Continued)

FOREIGN PATENT DOCUMENTS

WO WO 2016/039779 3/2016

*Primary Examiner* — Scott S Trotter
(74) *Attorney, Agent, or Firm* — Hawley Troxell Ennis & Hawley LLP; Philip McKay

(57) ABSTRACT

A method and system applies analytics models to a tax return preparation system to determine a likelihood of qualification for an earned income tax credit by a user, according to one embodiment. The method and system receive user data and applying the user data to a predictive model to cause the predictive model to determine, at least partially based on the user data, a likelihood of qualification for an earned income tax credit for the user, according to one embodiment. The method and system display, for the user, an estimated tax return benefit to the user, at least partially based on the likelihood of qualification for the earned income tax credit exceeding a predetermined threshold, to reduce delays in presenting estimated earned income tax credit benefits to the user during a tax return preparation session in a tax return preparation system, according to one embodiment.

25 Claims, 5 Drawing Sheets

(56) References Cited

U.S. PATENT DOCUMENTS

| | | |
|---|---|---|
| 2006/0294084 A1 | 12/2006 | Patel et al. |
| 2008/0071703 A1 | 3/2008 | Evans |
| 2008/0127127 A1 | 5/2008 | Chitgupakar et al. |
| 2008/0147494 A1 | 6/2008 | Larson |
| 2009/0106178 A1 | 4/2009 | Chu |
| 2009/0313086 A1 | 12/2009 | Lee et al. |
| 2011/0264569 A1 | 10/2011 | Houseworth et al. |
| 2012/0109792 A1 | 5/2012 | Eftekhari et al. |
| 2013/0198047 A1* | 8/2013 | Houseworth ........ G06Q 40/123 705/31 |
| 2013/0268468 A1 | 10/2013 | Vijayaraghavan et al. |
| 2013/0282539 A1 | 10/2013 | Murray |
| 2014/0067518 A1 | 3/2014 | McGovern |
| 2014/0068600 A1 | 3/2014 | Ashok et al. |
| 2014/0122381 A1 | 5/2014 | Nowozin |
| 2014/0201045 A1 | 7/2014 | Pai et al. |
| 2014/0359261 A1 | 12/2014 | Collins et al. |
| 2015/0227962 A1 | 8/2015 | Wical et al. |
| 2016/0012350 A1 | 1/2016 | Narayanan et al. |
| 2016/0098804 A1 | 4/2016 | Mascaro et al. |
| 2016/0103667 A1 | 4/2016 | Chen et al. |
| 2016/0247239 A1* | 8/2016 | Houseworth ........ G06Q 40/123 |
| 2016/0350870 A1 | 12/2016 | Morin et al. |
| 2017/0090893 A1 | 3/2017 | Aditya et al. |
| 2017/0178199 A1 | 6/2017 | Cessna et al. |
| 2017/0186097 A1 | 6/2017 | Mascaro et al. |
| 2017/0200087 A1 | 7/2017 | Mascaro et al. |
| 2017/0300933 A1 | 10/2017 | Mascaro et al. |
| 2017/0308960 A1 | 10/2017 | Mascaro et al. |

\* cited by examiner

| FALSE NEGATIVE RATE | FALSE POSITIVE RATE | FALSE NEGATIVE (FN) | TRUE NEGATIVE (TN) | TRUE POSITIVE (TP) | FALSE POSITIVE (FP) | TN + TP |
|---|---|---|---|---|---|---|
| FN / (FN + TP) | FP / (FP + TN) | WRONGLY IDENTIFIED AS NOT EITC QUALIFIED | CORRECTLY IDENTIFIED AS NOT EITC QUALIFIED | CORRECTLY IDENTIFIED AS EITC QUALIFIED | WRONGLY IDENTIFIED AS EITC QUALIFIED | TN + TP |
| 0.004 | 0.2 | 0.02 | 18.50 | 5.68 | 4.60 | 25.00 |
| 0.007 | 0.15 | 0.04 | 19.60 | 5.66 | 3.50 | 25.90 |
| 0.011 | 0.1 | 0.06 | 20.80 | 5.64 | 2.30 | 26.60 |
| 0.018 | 0.05 | 0.10 | 22.00 | 5.60 | 1.10 | 27.60 |

METHOD AND SYSTEM FOR APPLYING ANALYTICS MODELS TO A TAX RETURN PREPARATION SYSTEM TO DETERMINE A LIKELIHOOD OF RECEIVING EARNED INCOME TAX CREDIT BY A USER

BACKGROUND

Federal and State Tax law has become so complex that it is now estimated that each year Americans alone use over 6 billion person hours, and spend nearly 4 billion dollars, in an effort to comply with Federal and State Tax statutes. Given this level of complexity and cost, it is not surprising that more and more taxpayers find it necessary to obtain help, in one form or another, to prepare their taxes. Tax return preparation systems, such as tax return preparation software programs and applications, represent a potentially flexible, highly accessible, and affordable source of tax preparation assistance. However, traditional tax return preparation systems are, by design, fairly generic in nature and often lack the malleability to meet the specific needs of a given user.

For instance, traditional tax return preparation systems often present a fixed, e.g., predetermined and pre-packaged, structure or sequence of questions and tax return amounts to all users as part of the tax return preparation interview process. This is largely due to the fact that the traditional tax return preparation system analytics use a sequence of interview questions, and/or other user experiences, that are static features and that are typically hard-coded elements of the tax return preparation system and do not lend themselves to effective or efficient modification. As a result, the user experience, and any analysis associated with the interview process and user experience, is a largely inflexible component of a given version of the tax return preparation system. There is therefore little or no opportunity for any analytics associated with the interview process, and/or user experience, to evolve to meet a changing situation or the particular needs of a given taxpayer, even as more information about that taxpayer, and their particular circumstances, is obtained.

As an example, many users who file early in the tax season are filing because they expect a tax return. To these users, the most important information of the entire interview process is the dollar amount they will receive back from the government. However, to their dismay, traditional tax return preparation systems string the user along through a seemingly endless question and answer session before ever providing even partial tax return dollar amounts. Since the motivation of the user for initiating the tax return preparation process is to find out how much the user can expect or estimate to get back, it can be extraordinarily frustrating to have to wait until half way or longer through the interview session before receiving an indication of the amount of their tax return.

What is needed is a method and system for applying analytics models to a tax return preparation system to determine a likelihood of qualification for earned income tax credit by a user, to reduce the delays in presenting earned income tax credit benefits to the user during a tax return preparation session, and to reduce a likelihood of abandonment of a tax return preparation session, for example, due to feelings of frustration.

SUMMARY

Embodiments of the present disclosure address some of the shortcomings associated with traditional tax return preparation systems by applying one or more analytics models to a tax return preparation system to determine a likelihood of qualification for an earned income tax credit by a user. Many users are eager to file tax returns during tax season because they anticipate receipt of money from the government for overpaid taxes or because of government benefits, such as the earned income tax credit. In some instances, tax filers may receive thousands of dollars from the government by filing their taxes. The anticipation of paying for family vacations, paying off holiday-accrued debts, and purchasing merchandise can create a kind of euphoria or excitement towards filing tax returns, for some tax filers. As disclosed herein, by applying one or more analytics models to user data in a tax return preparation system, the tax return preparation system can estimate or predict whether a user will receive earned income tax credit ("EITC"), well before the user has entered the exact information needed to complete the EITC portions of a tax return. These feature enables to tax return preparation system to satiate users' yearning to find out how much money they will receive early within a tax return preparation interview or session, rather than delaying the gratification to the end or near the end of the tax return preparation interview session. Indeed, having to wait for an entire (substantial amount of a) tax return preparation session to receive a specific piece of information can be frustrating and can cause users to incorrectly feel that the tax return preparation system is ill-equipped to meet the users' particular needs. By using analytics models (e.g., predictive models), the tax return preparation system can be configured to provide EITC benefit information early on in the interview, generating motivation for the user to continue and complete the interview to receive their anticipated financial kick-back. Furthermore, by determining that some users do not qualify for EITC, by using analytics models, the tax return preparation system can postpone or delay the presentation of EITC-related questions that are less relevant to a user and thereby reduce the duration of some users' tax return preparation interviews/sessions.

By applying analytics models to a tax return preparation system to identify users who receive EITC benefits, a tax return preparation system reduces an average time consumed for some users preparing tax returns, and provides motivation for other users to complete their tax returns with a tax return preparation system, thereby providing for significant improvement to the fields of user experience, electronic tax return preparation, data collection, and data processing, according to one embodiment. As one illustrative example, by selectively omitting or delaying the presentation of EITC-related questions to users who do not qualify for EITC benefits, embodiments of the present disclosure allows for progressing a user through a tax return preparation session with fewer computer processing cycles and less communications bandwidth. As a result, embodiments of the present disclosure allow for improved processor performance, more efficient use of memory access and data storage capabilities, reduced communication channel bandwidth utilization, and faster communications connections. Consequently, computing and communication systems implementing and/or providing the embodiments of the present disclosure are transformed into faster and more operationally efficient devices and systems.

In addition to improving overall computing performance, by using analytics models (e.g., predictive models) to select relevant questions for a user, implementation of embodiments of the present disclosure represent a significant improvement to the field of providing an efficient user experience and, in particular, efficient use of human and non-human resources. As one illustrative example, by reducing the number of irrelevant questions provided to a user of a tax return preparation system, the user can devote less time and energy to preparing his/her taxes. Additionally, providing EITC benefits information early on in the tax return preparation interview/session, the tax return preparation system maintains, improves, and/or increases the likelihood that a potential customer will convert into a paying customer because the potential customer is receiving confirmation that the tax return preparation system appears to provide the information the users' are seeking. Consequently, using embodiments of the present disclosure, the user experience is less burdensome and time consuming and allows the user to dedicate more of his or her time to other activities or endeavors, while having confidence that the tax return preparation system is adequately addressing tax-related issues that are pertinent to the user.

BRIEF DESCRIPTION OF THE DRAWINGS

FIG. 4 is a chart of performance metrics for an example predictive model of the software architecture of FIG. 1, according to one embodiment

Figure 1:
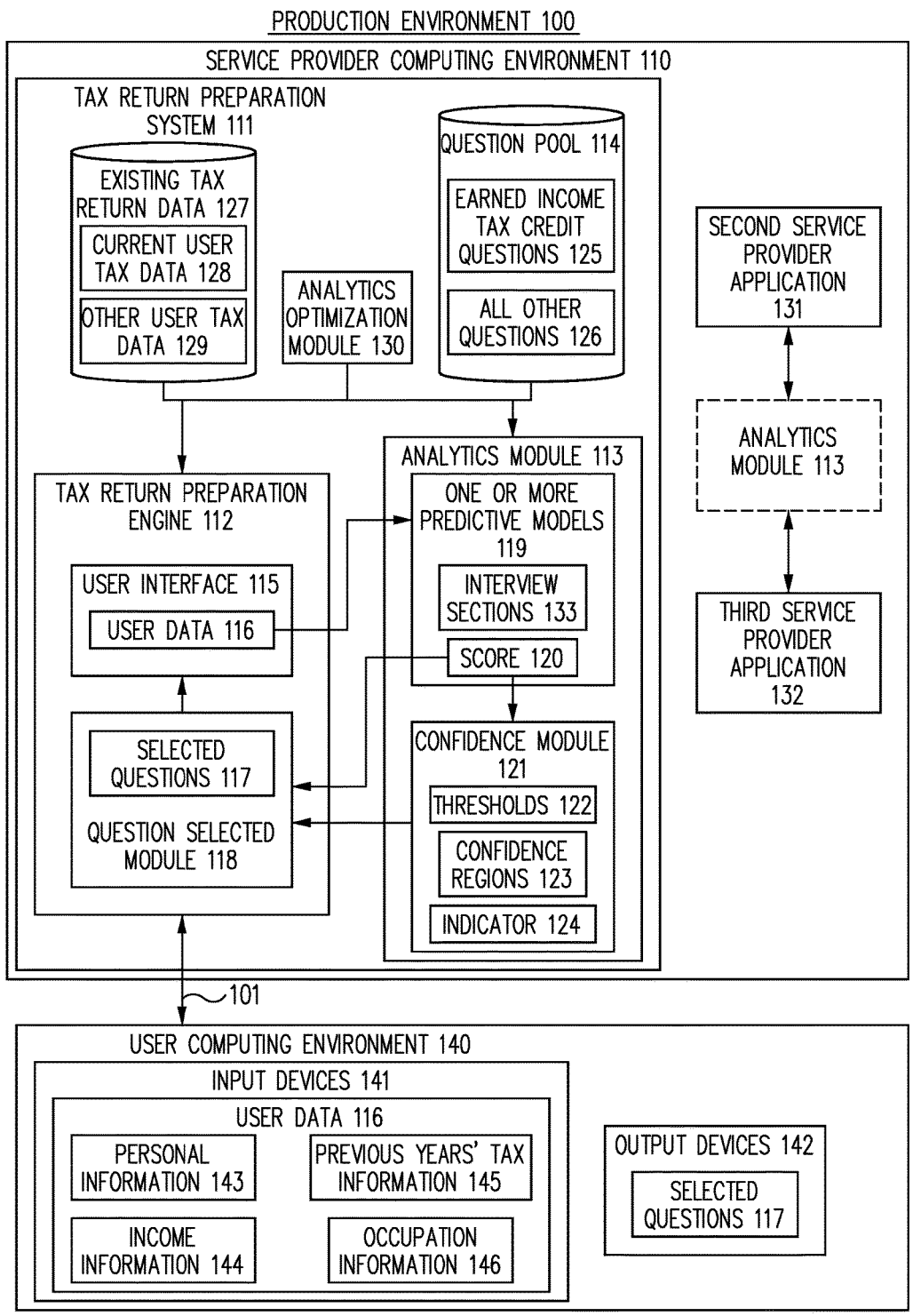
FIG. 1 is a block diagram of software architecture for applying analytics models to a tax return preparation system to determine a likelihood of qualification for earned income tax credit by a user, in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

The INTRODUCTORY SYSTEM, HARDWARE ARCHITECTURE, and PROCESS sections herein describe systems and processes suitable for applying analytics models (e.g., predictive models) to a tax return preparation system to determine a likelihood of a user qualifying for earned income tax credit, to reduce the delays in presenting earned income tax credit benefits to the user during a tax return preparation session, and to reduce a likelihood of abandonment of a tax return preparation session, for example, due to feelings of frustration, according to various embodiments.

Introductory System

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system," "computing device," and "computing entity," include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms "computing system" and "computing entity," can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as one or more virtual assets.

In one embodiment, two or more assets, such as computing systems and/or virtual assets, and/or two or more computing environments, are connected by one or more communications channels including but not limited to, Secure Sockets Layer (SSL) communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the terms "interview" and "interview process" include, but are not limited to, an electronic, software-based, and/or automated delivery of multiple questions to a user and an electronic, software-based, and/or automated receipt of responses from the user to the questions, to progress a user through one or more groups or topics of questions, according to various embodiments.

As used herein, the term "user experience" includes not only the interview process, interview process questioning, and interview process questioning sequence, but also other user experience features provided or displayed to the user such as, but not limited to, interfaces, images, assistance resources, backgrounds, avatars, highlighting mechanisms, icons, and any other features that individually, or in combination, create a user experience, as discussed herein, and/or as known in the art at the time of filing, and/or as developed after the time of filing.

Hardware Architecture

FIG. 1 illustrates a block diagram of a production environment 100 for applying analytics models to a tax return preparation system to determine a likelihood of qualification for earned income tax credit by a user, according to one embodiment. By applying one or more analytics models (e.g., predictive models) to user data in the tax return preparation system, the tax return preparation system can motivate users to continue/complete the tax return preparation interview/session, can reduce a duration of the tax return preparation interview/session, and can thereby reduce a likelihood of abandonment by users, according to one embodiment. In one embodiment, the tax return preparation system receives user data, applies the user data to a predictive model, and displays an estimated tax return benefit to the user, at least partially based on the likelihood of the user's qualification for the earned income tax credit ("EITC"). In one embodiment, different analytics models are applied to the user's data during different sections of the tax return preparation interview/session. In one embodiment, the different analytics models use different thresholds for determining the likelihood of a user's qualification for EITC. In one embodiment, different analytics models receive varying inputs (e.g., only personal information; only personal information and occupation information; personal information, occupation information, and income information, etc.), for determining the likelihood of a user's qualification for EITC benefits. In one embodiment, occupation information is used to estimate income for the user so that EITC benefits can be displayed prior to receiving all of a user's income and wages information. These and other embodiments are disclosed in more detail below.

The production environment 100 includes a service provider computing environment 110 and a user computing environment 140 for using analytics models for identifying users who are likely to qualify to receive EITC benefits, according to one embodiment. The computing environments 110 and 140 are communicatively coupled to each other with a network and/or a communication channel 101, according to one embodiment.

The service provider computing environment 110 represents one or more computing systems such as, but not limited to, a server, a computing cabinet, and/or distribution center that is configured to receive, execute, and host one or more applications for access by one or more users, e.g., clients of the service provider, according to one embodiment. The service provider computing environment 110 represents a traditional data center computing environment, a virtual asset computing environment (e.g., a cloud computing environment), or a hybrid between a traditional data center computing environment and a virtual asset computing environment, according to one embodiment. The one or more applications can include, but are not limited to tax return preparation systems, other financial management systems, and applications that support the tax return preparation systems and/or the other financial management systems, according to one embodiment. The service provider computing environment 110 includes a tax return preparation system 111 that utilizes one or more predictive models to determine a likelihood of a user qualifying for EITC benefits at different times during a tax return preparation interview/session, so that the tax return preparation system 111 can motivate the user by displaying EITC benefits early in the tax return preparation session, and/or so the tax return preparation system 111 can omit, skip, and/or postpone tax questions related to EITC if the likelihood of qualifying for the benefit is low (e.g., exceeds a predetermined threshold), according to one embodiment. By identifying users who are likely to qualify or not qualify for EITC benefits, the tax return preparation system 111 can motivate users to complete the interview and/or can reduce the amount of time users spend in tax return preparation interviews by partially or wholly skipping or postponing questions that would be less relevant to a particular user. When applied to millions of users per tax season, the time saved by partially or wholly skipping or postponing less-relevant questions can reduce tax return computing cycles of tens of thousands of hours each tax season, saving service providers' costs associated with running and maintaining computing systems. The tax return preparation system 111 includes various components, databases, engines, modules, and data to support identifying users who are likely and who are unlikely to qualify for EITC benefits, according to one embodiment. The tax return preparation system 111 includes a tax return preparation engine 112, an analytics module 113, and a question pool 114, according to one embodiment.

The tax return preparation engine 112 guides the user through the tax return preparation process by presenting the user with questions, according to one embodiment. The tax return preparation process includes progressing a user through a tax return preparation interview or session. The tax return preparation interview can be broken into multiple tax return preparation sessions, during which the user accesses or "logs into" the tax return preparation system 111, according to one embodiment. A user may access or login to the tax return preparation system 111 multiple times, e.g., in multiple sessions, to complete a tax return preparation interview. At the end of a tax return preparation interview, the tax return preparation system 111 files a federal tax return, and may file one or more state tax returns (as needed), in response to receiving instructions from the user to do so, according to one embodiment. Thus, the tax return preparation process can include, but is not limited to: completing a tax return preparation interview to enable the tax return preparation system 111 to complete/prepare a tax return for the user, and filing one or more federal and state tax returns, according to one embodiment. The completion and filing of the one or more federal and state tax returns are processed over one or more tax return preparation sessions, in which the user accesses or logs into the tax return preparation system 111, according to one embodiment.

The tax return preparation engine 112 includes a user interface 115 to gather and receive user data 116 from the user and to present selected questions 117 to the user, to progress the user through the tax return preparation process, according to one embodiment. The user interface 115 includes one or more user experience elements and graphical user interface tools, such as, but not limited to, buttons, slides, dialog boxes, text boxes, drop-down menus, banners, tabs, directory trees, links, audio content, video content, and/or other multimedia content for communicating information to the user and for receiving the user data 116 from the user, according to one embodiment.

The tax return preparation engine 112 employs the user interface 115 to receive the user data 116 from input devices 141 of the user computing environment 140 and employs the user interface 115 to transmit the selected questions 117 to output devices 142 of the user computing environment 140, according to one embodiment. The input devices 141 include, but are not limited to, touchscreens, mice, keyboards, microphones, cameras, touchpads, and the like, and are configured to receive various types of user data 116, according to one embodiment. For example, the input devices 141 gather user data 116 such as personal information 143, income information 144, previous years' tax information 145, and occupation information 146, according to one embodiment. The user data 116 can also include user responses to the selected questions 117 that are presented to the user by the tax return preparation system 111. The output devices 142 include, but are not limited to, monitors, speakers, touchscreens, and the like, according to one embodiment. The output devices 142 display/present the selected questions 117 and various user interface elements to the user, as provided by the tax return preparation system 111, according to one embodiment.

The user data 116 received by the user interface 115 represents both the information that is obtained from the user through the user computing environment 140, as well as information that is obtained from other sources, according to one embodiment. For example, the user data 116 can include information from existing tax return data 127, such as one or more previous years' tax return data for a particular user. The existing tax return data 127 is stored in a data store, a database, and/or a data structure, according to one embodiment. The user data 116 can also include information that the tax return preparation system gathers directly from one or more external sources such as, but not limited to, a payroll management company, state agencies, federal agencies, employers, military records, public records, private companies, and the like, according to one embodiment. More particular examples of the user data 116 include, but are not limited to, a user's name, a Social Security number, government identification, a driver's license number, a date of birth, an address, a zip code, a home ownership status, a marital status, an annual income, a job title, an employer's address, spousal information, children's information, asset information, medical history, occupation, information regarding dependents, salary and wages, interest income, dividend income, business income, farm income, capital gain income, pension income, IRA distributions, unemployment compensation, education expenses, health savings account deductions, moving expenses, IRA deductions, student loan interest deductions, tuition and fees, medical and dental expenses, state and local taxes, real estate taxes, personal property tax, mortgage interest, charitable contributions, casualty and theft losses, unreimbursed employee expenses, alternative minimum tax, foreign tax credit, education tax credits, retirement savings contribution, child tax credits, residential energy credits, and any other information that is currently used, that can be used, or that may be used in the future, in a financial system or in the preparation of a user's tax return, according to various embodiments. In some implementations, the user data 116 is a subset of all of the user information used by the tax return preparation system 111 to prepare the user's tax return, e.g., is limited to marital status, children's information, and annual income. The personal information 143 and the income information 144 of the user data can be limited to a subset of the user data 116 which may include, but not be limited to, an age of the user, an age of a spouse of the user, a zip code, a tax return filing status, state income, a home ownership status, a home rental status, a retirement status, a student status, an occupation of the user, an occupation of a spouse of the user, whether the user is claimed as a dependent, whether a spouse of the user is claimed as a dependent, whether another taxpayer is capable of claiming the user as a dependent, whether a spouse of the user is capable of being claimed as a dependent, salary and wages, taxable interest income, ordinary dividend income, qualified dividend income, business income, farm income, capital gains income, taxable pension income, pension income amount, IRA distributions, unemployment compensation, taxable IRA, taxable Social Security income, amount of Social Security income, amount of local state taxes paid, whether the user filed a previous years' federal itemized deduction, whether the user filed a previous years' state itemized deduction, number of dependents, and whether the user is a returning user to the tax return preparation system. In one embodiment, occupation information 146 includes one or more of occupation description, job title, occupation subcategory, and geographical location of occupation (e.g., a zip code).

The user data 116 can also include browsing behavior data that is obtained from the user's interaction with the user interface 115 of the tax return preparation system 111, and can also include information obtained from Internet advertising companies, public records servers, social media servers, and the like, according to one embodiment. The user data 116 can dynamically change as the user enters additional information, so the tax return preparation engine 112 can be configured to periodically or continuously receives, update, and transmit the user data 116 to the analytics module 113 to enable the analytics module 113 to continuously update the likelihood of qualification for EITC benefits for the user. Periodically or continuously providing user data 116 to the analytics module 113 also enables the tax return preparation system to personalize (e.g., display EITC benefits) and/or reduce the duration of the tax return preparation process by determining which questions from the question pool 114 are applicable to assisting a user in efficiently filing his/her tax return with the tax return preparation system 111, according to one embodiment. The question pool 114 includes a data store, a database, and/or some type of data structure to store the questions, according to one embodiment.

The tax return preparation engine 112 presents selected questions 117 based on scores, indicators, or levels of confidence that are generated or provided by the analytics module 113, according to one embodiment. For example, when one or more of the predictive models within the analytics module 113 provides a score that is indicative of the likelihood that a user will or will not qualify for EITC benefits, the tax return preparation system 111 determines the selected questions 117 from the question pool 114 in order to reduce EITC questions provided to users who are unlikely to qualify for EITC benefits, according to one embodiment. The tax return preparation engine 112 includes a question selection module 118 for at least partially determining whether to include EITC related questions and/or how many EITC questions to include in the selected questions 117, according to one embodiment. The question selection module 118 is configured to receive a score, an indicator, and/or a level of confidence from the analytics module 113 and/or from one or more of the predictive models within the analytics module, from which the question selection module 118 determines how many (if any), EITC related questions to include in the selected questions 117 that are provided to the user. The question selection module 118 and/or the confidence module 121 provides information to the tax return preparation engine 112 to enable the tax return preparation engine 112 to display EITC benefit information to a user in the user interface 115, according to one embodiment. The tax return preparation engine 112 provides real-time EITC benefit updates to the user, as the user enters additional personal information, according to one embodiment.

The analytics module 113 receives user data and determines the likelihood that the user qualifies for EITC benefits, according to one embodiment. The analytics module 113 includes one or more predictive models 119 for determining a likelihood that a user does or does not qualify for EITC benefits, according to one embodiment. The one or more predictive models 119 receive user data 116, which includes the personal information 143, the income information 144, the previous years' tax information 145, and/or the occupation information 146, according to one embodiment. Using this data, the one or more predictive models 119 generate a score 120 that is from 0 to 1, i.e., that is no less than 0 and no greater than 1, according to one embodiment. The score 120 is a floating-point number that represents the likelihood or probability that a particular user is likely to qualify. The closer the score 120 is to 1, the higher the likelihood/probability/certainty is that the user will qualify for EITC, according to one embodiment. The closer the score 120 is to 0, the lower the likelihood/probability/certainty is that the user will qualify for EITC, according to one embodiment. In another embodiment, the closer the score 120 is to 1, the lower the likelihood/probability/certainty is that the user will qualify for EITC, and the closer the score 120 is to 0, the higher the likelihood/probability/certainty is that the user will qualify for EITC, according to one embodiment. In one embodiment, the higher the score 120 is, the more EITC benefit a user is likely to receive (e.g., $6,000). In one embodiment, the lower the score 120 is, the closer to the EITC benefit is to nothing (e.g., $0).

The one or more predictive models 119 can include multiple predictive models, which can deployed in different interview sections 133, according to one embodiment. For example, the one or more predictive models 119 can include three predictive models. A first predictive model can be executed by the tax return preparation system 111 if the user enters a first section (e.g., a personal information section) of the tax return preparation interview/session. A second predictive model can be executed by the tax return preparation system 111 if the user enters a second section (e.g., occupation information section) of the tax return preparation interview/session. A third predictive model can be executed by the tax return preparation system 111 if the user enters a third section (e.g., income information section) of the tax return preparation interview/session, according to various embodiments.

Each of the first, second and third predictive models (e.g., the one or more predictive models 119) can have different inputs and can be configured with different thresholds (e.g., thresholds 122), for each of the different interview sections 133, according to one embodiment. For example, the first predictive model can be configured to determine the likelihood of a user qualifying for EITC, based on personal information received from the personal information section of the interview and/or based on whether the user qualified for EITC benefits in one or more previous years, according to one embodiment. The second predictive model can be configured to determine the likelihood of a user qualifying for EITC, based on occupation information (e.g., job title, occupation subcategory, geographic location, etc.) received from the occupation information section of the interview, and/or based on personal information received from the personal information section of the interview, and/or based on whether the user qualified for EITC benefits in one or more previous years. The third predictive model can be configured to determine the likelihood of a user qualifying for EITC, based on income information (e.g., self-employment, W-2 wages, disability income, etc.) received from the income information section of the interview, and/or based on occupation information (e.g., job title, occupation subcategory, geographic location, etc.) received from the occupation information section of the interview, and/or based on personal information received from the personal information section of the interview, and/or based on whether the user qualified for EITC benefits in one or more previous years. In some cases, a user will skip the occupation information section and will go to the income section, or vise-versa, thus, the one or more predictive models 119 can include multiple predictive models or other analytics models that are configured to be used by the tax return preparation system 111 at different times and in different sections of the tax return preparation interview/session, according to one embodiment. If the analytics module 113 determines that the user is likely to qualify for EITC benefits, the tax return preparation engine displays an estimated benefit, e.g., in dollars, for the user to view, using the user interface 115, according to one embodiment.

The analytics module 113 uses the occupation information 146 to estimate income for the user before actually receiving income information from the user, according to one embodiment. It is simple to receive a job title or sub-category of occupation from a user, and it is quite easy for the user to provide the occupation information 146. In one embodiment, the tax return preparation system 111 is configured to query the user for his/her occupation information 146 early in the interview process, e.g., before the user needs to reference records, to ease the user into the interview process and to begin estimating the likelihood of the user qualifying for EITC benefits. In one embodiment, the tax return preparation system 111 maintains a table, database, or other data structure that correlates average salaries with geographic location, job titles, job sub-categories, and other occupational information. The tax return preparation system 111 then uses the average salary information to determine the likelihood of EITC qualification. Occupation or job title alone may not be sufficient, in some cases. For example, a user can be an attorney who is a public defender and who may make 50% or less of the annual salary of a corporate attorney. Accordingly, the tax return preparation system 111 can be configured to use sub-categories of occupations to further refine the average salary estimates, according to one embodiment.

In one embodiment, the one or more predictive models 119 include a single analytics model having multiple algorithms or sub-models/functions. In another embodiment, the one or more predictive models 119 include a plurality of analytics modules, with each of the plurality of modules performing a different function (e.g., configured to operate based on different inputs).

The analytics module 113 uses one or more techniques for analyzing the score 120, according to one embodiment. The analytics module 113 includes a confidence module 121 for analyzing the score 120, according to one embodiment. The confidence module 121 receives the score 120, and compares the score 120 to one or more thresholds 122. The thresholds 122 can be implemented as a single threshold, can be implemented as two thresholds, or can be implemented as multiple thresholds, in order to find one or more confidence regions 123, according to one embodiment. For example, the thresholds 122 can include a first threshold, e.g., 0.8, which when the score 120 exceeds (e.g., goes above) the first threshold, the confidence module 121 provides an indicator 124 that the user is highly likely to qualify for EITC benefits. In one embodiment, the indicator 124 is a flag, such as an "EITC" flag. As another example, the threshold 122 can include a second threshold, e.g., 0.4, which when the score 120 is exceeds (e.g., goes below) the second threshold, the confidence module 121 provides an indicator 124 that the user is highly unlikely to qualify for EITC benefits. In one embodiment, the indicator 124 is a flag, such as a "no EITC" flag. In one embodiment, the confidence module 121 outputs the score 120 and one or more indicators 124 to the tax return preparation engine 112, to enable the tax return preparation engine 112 to make suggestions or recommendations to the user or to cause the tax return preparation engine 112 to postpone the presentation of EITC questions until near the end of the tax return preparation interview or session, according to one embodiment.

Figure 2:
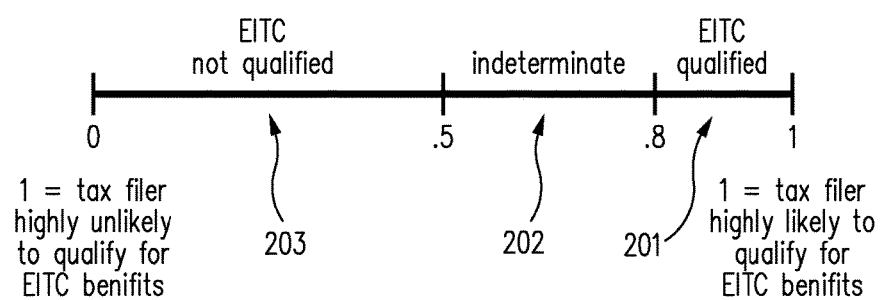
FIG. 2 is a block diagram of a score graph which illustrates multiple levels of confidence levels that may be generated by an analytics module in a tax return preparation system, in accordance with one embodiment.

FIG. 2 illustrates a confidence graph 200 which illustrates multiple levels of confidence that may be determined by the confidence module 121, according to one embodiment. The confidence module 121 can be configured to apply the thresholds 122 to the score 120 to find multiple confidence regions 123. The confidence regions 123 can include, for example, an EITC qualified region 201, an indeterminate region 202, and an EITC not qualified region 203, according to one embodiment. In one embodiment, a score 120 of 0.8 and greater separates the EITC qualified region 201 from the indeterminate region 202. In one embodiment, a score 120 of 0.5 and below separates the EITC not qualified region 203 from the indeterminate region 202. As illustrated, a score 120 of 1 indicates that the tax filer is highly likely to qualify for EITC benefits, and a score 120 of 0 indicates that the tax filer is highly unlikely to qualify for EITC benefits, according to one embodiment. Although examples of thresholds of 0.8 and 0.5 are illustrated, these example thresholds are not meant to be limiting and are only provided as example implementations/embodiments of thresholds.

The question selection module 118 is configured to populate the selected questions 117 from the question pool 114 at least partially based on the score 120, the confidence regions 123, and/or the indicator 124 received from the one or more predictive models 119, the confidence module 121, and/or the analytics module 113, according to one embodiment. For example, the question selection module 118 can be configured to insert the earned income tax credit questions 125 into the selected questions 117 for presentation to the user, when the confidence module 121 or the analytics module 113 provides an indicator 124 or a score 120 that is indicative of a high likelihood that the user qualifies for EITC benefits. In one embodiment, the question selection module 118 populates the selected questions 117 with the earned income tax credit questions 125 when the score 120 or the confidence regions 123 correspond with the EITC qualified region 201 (of FIG. 2). In one embodiment, the question selection module 118 sparingly, strategically, tactically populates the selected questions 117 with the earned income tax credit questions 125 when the score 120 or the confidence regions 123 correspond with the indeterminate region 202 (of FIG. 2). In one embodiment, the question selection module 118 populates the selected questions 117 with the all other questions 126 and omits or postpones the earned income tax credit questions 125 when the score 120 or the confidence regions 123 correspond with the EITC not qualified region 203 (of FIG. 2). Although the question selection module 118 is illustrated as being incorporated in the tax return preparation engine 112, in alternative embodiments, the question selection module 118 is configured to operate independently of the tax return preparation engine 112, according to one embodiment.

The service provider computing environment 110 trains the one or more predictive models 119 using existing tax return data 127, according to one embodiment. The existing tax return data 127 includes current user tax data 128 and other user tax data 129, according to one embodiment. The existing tax return data 127 includes tax data collected from previous years' tax return filings and/or includes tax data collected from a current year by users who have partially or completely prepared their tax returns using the tax return preparation system 111, according to one embodiment. The one or more predictive models 119 are trained using one or more of a variety of machine learning techniques including, but not limited to, regression, logistic regression, decision trees, artificial neural networks, support vector machines, linear regression, nearest neighbor methods, distance based methods, naive Bayes, linear discriminant analysis, k-nearest neighbor algorithm, or another mathematical, statistical, logical, or relational algorithm to determine correlations or other relationships between the user data (e.g., personal information, income information, occupation information, tax filing timing, etc.) and whether users previously qualified for EITC benefits. In other words, the one or more predictive models 119 are trained using existing inputs and outputs for the predictive models that are stored in the existing tax return data 127.

The analytics module 113 is illustrated and described as being incorporated in the tax return preparation system 111, but in alternative embodiments, the analytics module 113 is implemented independently of the tax return preparation system within the service provider computing environment 110. The analytics module 113 is optionally hosted on a different server, a different computing system, a different virtual device and/or as a different application than the tax return preparation system 111, according to one embodiment. The analytics module 113, when implemented externally to the tax return preparation system 111, receives the user data 116 from the tax return preparation system 111 over one or more networks and returns the score 120, the confidence regions 123, and/or the indicator 124 to the tax return preparation system 111 to enable the tax return preparation system 111 to select appropriate questions for presentation to the user, based on the likelihood that the user will qualify for EITC, according to one embodiment. In one embodiment, a second service provider application 131 and/or a third service provider application 132 also use the services of the analytics module 113, and the analytics module 113 is modularized to enable exchanging, updating, and/or replacing one or more of the one or more predictive models 119 without interrupting or without changing the applications hosted by the service provider computing environment 110 (e.g., the tax return preparation system 111).

The tax return preparation system 111 includes an analytics optimization module 130 for periodically updating and/or training the one or more predictive models 119 during use (e.g., during a current tax return preparation season), according to one embodiment. The analytics optimization module 130 monitors the accuracy of the analytics module 113 by comparing the predictions of the one or more predictive models 119 with the actual final selection made by the user or made by the tax return preparation system 111 regarding whether the user qualified for EITC. The analytics optimization module 130 is configured to adjust the thresholds 122 so that the tax return preparation system 111 provides EITC qualification estimates/predictions within the tolerances for error and accuracy that have been defined for the system.

Figure 3:
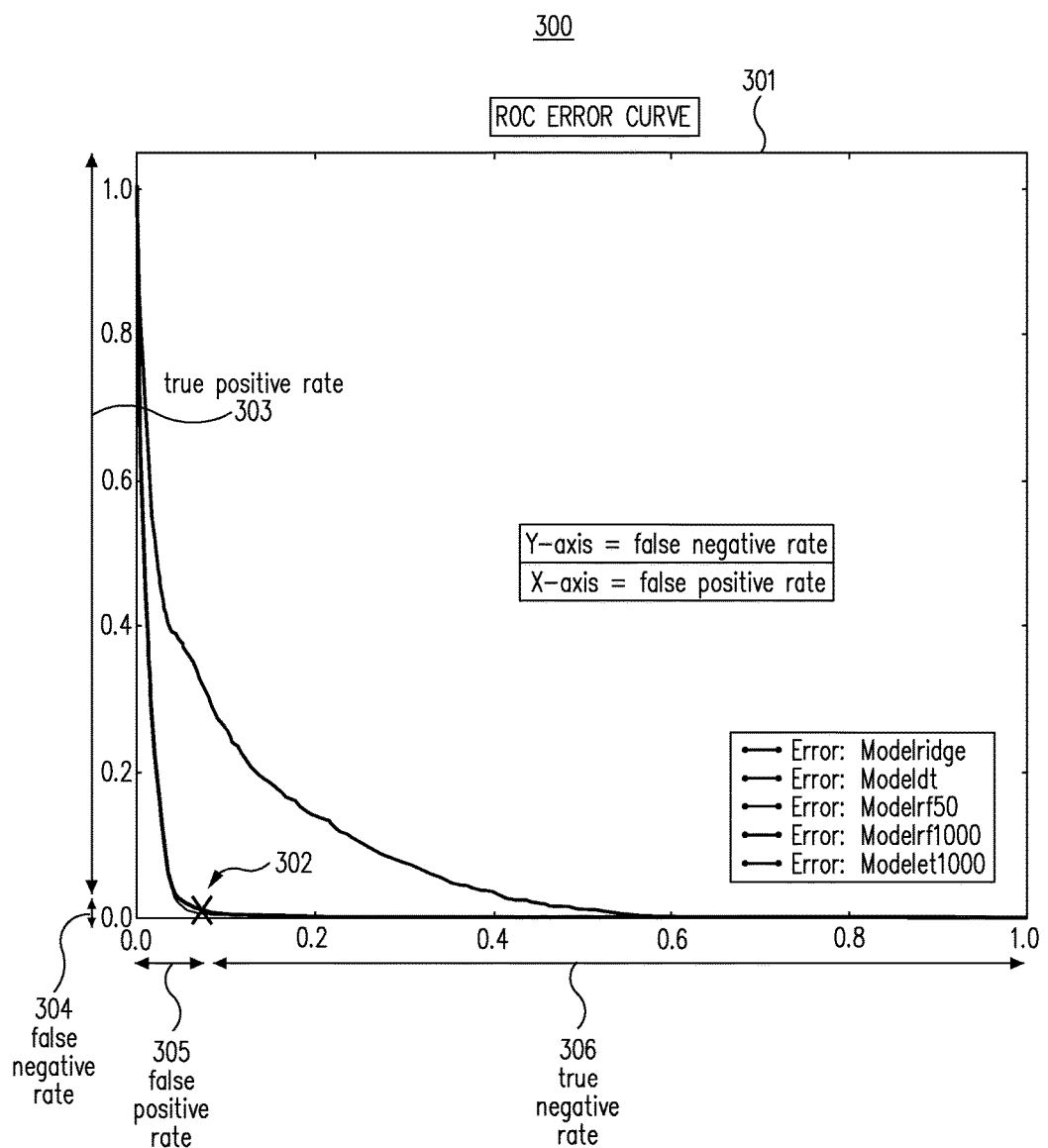
FIG. 3 is a diagram of a performance graph for one or more predictive models of the software architecture of FIG. 1, according to one embodiment

FIG. 3 illustrates a performance diagram 300 for one of the one or more predictive models 119, according to one embodiment. The performance diagram 300 is a receiver operation characteristics ("ROC") error curve 301 which maps a false negative rate against a false positive rate for the predictive models having, for example, inputs of personal information, occupation information, and income information, according to one embodiment. For a selected operating point 302 on the ROC error curve 301, a single true positive rate 303 and false negative rate 304 correspond with a single false positive rate 305 and true negative rate 306. As shown, the sum of the true positive rate 303 and the false negative rate 304 equal 1 and the sum of the false positive rate and the true negative rate equal 1. As an example of a tolerance for error and/or accuracy that can be defined for a system, the operating point 302 can be defined in terms of the false negative rate 304, the true positive rate 303, the false positive rate 305, and/or the true negative rate 306. In one embodiment, an operating point 302 such as a 0.011 false negative rate 304 and a 0.1 false positive rate 305 is selected as a selected operating point 302 for the system. As illustrated, the smaller the false negative rate 304 becomes, the larger the false positive rate 305 becomes, and vice versa. Therefore, attempts to make the false negative rate 304 smaller (i.e., making the true positive rate 303 larger) results in a larger false positive rate 305 (i.e. a smaller true negative rate 306). These rates are illustrated, defined and described in FIG. 4 and the corresponding discussion, hereafter. However, it is to be noted, that in one embodiment, the analytics optimization module 130 calculates and monitors one or more of the true positive rate 303, the false negative rate 304, the false positive rate 305, and the true negative rate 306 to determine whether the tax return preparation system 111 is operating at the defined or desired operating point 302, according to one embodiment. The ROC error curve 301 can model the performance of the predictive models 119 using a variety of algorithms such as, but not limited to, ridge linear regressor, decision tree, extra tree, and random forest, according to various embodiments.

FIG. 4 illustrates an example of a performance chart 400 for various performance metrics of an example predictive model (e.g., the one or more predictive models 119), according to one embodiment. The columns of the performance chart 400 include a false negative rate, a false positive rate, a false negative ("FN") count, a true negative ("TN") count, a true positive ("TP") count, a false positive ("FP") count, and accuracy. Each column also indicates how each metric is defined. Prior to defining each of the metrics, a brief reference is made to the confusion matrix of Table 1.

TABLE 1

|  |  | Actual | |
|---|---|---|---|
|  |  | EITC Qualified | EITC Not Qualified |
| Predicted | EITC Qualified | TP | FP |
|  | EITC Not Qualified | FN | TN |
|  |  | total P | total N |

The confusion matrix of Table 1 is a table with two rows and two columns, which reports the number of true positives, false positives, false negatives, and true negatives. In one embodiment, users who qualify for EITC are positives and users who do not qualify for EITC are negatives. A true positive, for the present disclosure, is a user who is correctly identified/classified as qualifying for EITC. A person identified as a true positive receives benefit from the predictive model because that user receives indication of qualifying for EITC benefits as the user goes through the tax return preparation questions. A false positive is a user who is incorrectly identified/classified as qualifying for EITC. A person identified as a false positive is a person who could have received the benefit of a shorter tax return preparation interview, but the person was incorrectly identified as needing to review and respond to the questions associated with the EITC. Therefore, the false positives and the false positive rate are metrics that indicate inefficiencies in the predictive model. A false negative is a user who is incorrectly identified/classified as initially not qualifying for EITC. If the tax return preparation system 111 does not catch this error later in the interview then this user has the potential of filing a tax return without the tax break associated with EITC. In practice, the tax return preparation system 111 will most likely eventually identify these users as needing to review and respond to the EITC questions as the predictive models continue to evaluate these users' inputs throughout a tax return preparation interview. Because the one or more predictive models 119 periodically or continuously reevaluate the scores assigned to a particular user, as more information is provided to the tax return preparation system 111, the one or more predictive models 119 can be configured to eventually identify the false negative users so that these misclassified users do not forfeit potential returned income (or pay too much in taxes). A true negative is a user who is correctly identified/classified as not qualified for EITC. These users obtain the benefit of receiving fewer EITC questions (or have the questions postposed to an optional section of the interview) and receive a shorter interview.

With reference to the performance chart 400 and Table 1, the false negative rate is defined as:

FALSE NEGATIVE RATE=FN/(FN+TP), and the false positive rate is defined as:

FALSE POSITIVE RATE=FP/(FP+TN).

The false positive rate (also called a false alarm rate) is a performance metric of the predictive model and is the rate with which the model incorrectly classifies people as qualifying for EITC even though they could have skipped the EITC questions because they actually do not qualify. The false negative rate (also called the miss rate) is a performance metric of the predictive model and is the rate with which the model incorrectly classifies people as not qualifying for EITC even though their income indicates otherwise. The false negative rate is one predictive model performance metric by which the operating point of the tax return preparation system can be set (e.g., <=0.05), according to one embodiment, to reduce the liability or negative impact of miss classifying users in such a way that they have the potential of paying more taxes than legally obligated.

By applying analytics models to a tax return preparation system to identify users who receive EITC benefits, a tax return preparation system reduces an average time consumed for some users preparing tax returns, and provides motivation for other users to complete their tax returns with a tax return preparation system, thereby providing for significant improvement to the fields of user experience, electronic tax return preparation, data collection, and data processing, according to one embodiment. As one illustrative example, by selectively omitting or delaying the presentation of EITC-related questions to users who do not qualify for EITC benefits, embodiments of the present disclosure allows for progressing a user through a tax return preparation session with fewer computer processing cycles and less communications bandwidth. As a result, embodiments of the present disclosure allow for improved processor performance, more efficient use of memory access and data storage capabilities, reduced communication channel bandwidth utilization, and faster communications connections. Consequently, computing and communication systems implementing and/or providing the embodiments of the present disclosure are transformed into faster and more operationally efficient devices and systems.

In addition to improving overall computing performance, by using analytics models (e.g., predictive models) to select relevant questions for a user, implementation of embodiments of the present disclosure represent a significant improvement to the field of providing an efficient user experience and, in particular, efficient use of human and non-human resources. As one illustrative example, by reducing the number of irrelevant questions provided to a user of a tax return preparation system, the user can devote less time and energy to preparing his/her taxes. Additionally, providing EITC benefits information early on in the tax return preparation interview/session, the tax return preparation system maintains, improves, and/or increases the likelihood that a potential customer will convert into a paying customer because the potential customer is receiving confirmation that the tax return preparation system appears to provide the information the users' are seeking. Consequently, using embodiments of the present disclosure, the user experience is less burdensome and time consuming and allows the user to dedicate more of his or her time to other activities or endeavors, while having confidence that the tax return preparation system is adequately addressing tax-related issues that are pertinent to the user.

Process

Figure 5:
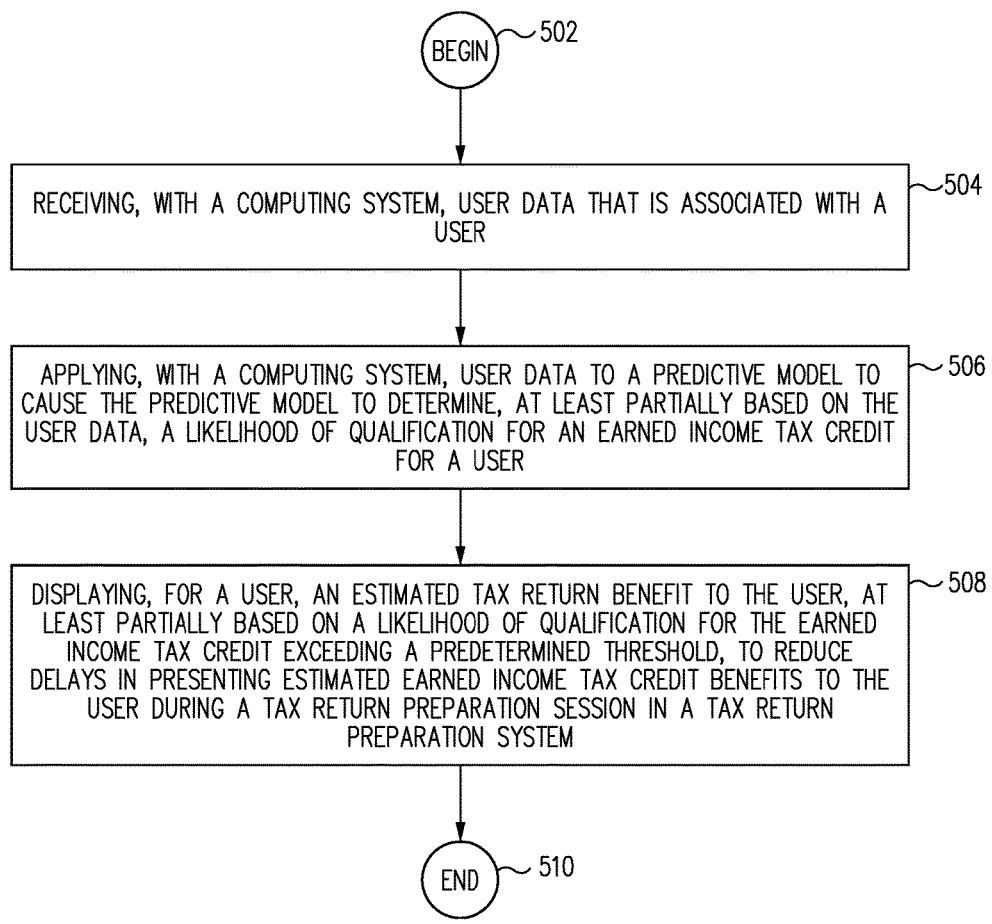
FIG. 5 is a flow diagram for applying analytics models to a tax return preparation system to determine a likelihood of qualification for earned income tax credit by a user, in accordance with one embodiment.

FIG. 5 illustrates a flow diagram of a process 500 for applying analytics models to a tax return preparation system to determine a likelihood of qualification for an earned income tax credit by a user, according to one embodiment.

At operation 502, the process begins.

At operation 504, the process includes receiving, with a computing system, user data that is associated with a user, according to one embodiment.

At operation 506, the process includes applying, with the computing system, the user data to a predictive model to cause the predictive model to determine, at least partially based on the user data, a likelihood of qualification for an earned income tax credit for the user, according to one embodiment.

At operation 508, the process includes displaying, for the user, an estimated tax return benefit to the user, at least partially based on the likelihood of qualification for the earned income tax credit exceeding a predetermined threshold, to reduce delays in presenting estimated earned income tax credit benefits to the user during a tax return preparation session in a tax return preparation system.

At operation 510, the process ends.

In one embodiment, applying the user data to the predictive model includes applying the user data to the predictive model during one of a number of sections within the tax return preparation session.

In one embodiment, the number of sections within the tax return preparation session include a personal information acquisition section, an occupation information acquisition section, and an income acquisition section.

In one embodiment, the predetermined threshold is at least partially based on a false negative rate of a receiver operating curve, the false negative rate being at least partially based on wrongly identifying users as not qualifying for the earned income tax credit.

In one embodiment, the predictive model is one of a plurality of predictive models that each determines the likelihood of qualification for the earned income tax credit for the user, wherein each of the plurality of predictive models is used by the tax return preparation system during a different one of a number of sections of the tax return preparation system.

In one embodiment, the number of sections within the tax return preparation session include a personal information acquisition section, an occupation information acquisition section, and an income acquisition section.

In one embodiment, a first of the plurality of predictive models is used by the tax return preparation system during the personal information acquisition section and the first of the plurality of predictive models receives personal information as a first input. A second of the plurality of predictive models is used by the tax return preparation system if the user enters the occupation information acquisition section and the second of the plurality of predictive models receives occupation information as a second input. A third of the plurality of predictive models is used by the tax return preparation system if the user enters the income acquisition section and the third of the plurality of predictive models receives income information as a third input. The first input, second input, and third input include different quantities of user information.

In one embodiment, the predetermined threshold is one of a plurality of predetermined thresholds for the likelihood of qualification for the earned income tax credit; the first of the plurality of predictive models applies a first of the plurality of predetermined thresholds to determine the likelihood of qualification for the earned income tax credit; the second of the plurality of predictive models applies a second of the plurality of predetermined thresholds to determine the likelihood of qualification for the earned income tax credit; and the third of the plurality of predictive models applies a third of the plurality of predetermined thresholds to determine the likelihood of qualification for the earned income tax credit.

In one embodiment, each of the first of the plurality of predetermined thresholds, the second of the plurality of predetermined thresholds, and the third of the plurality of predetermined thresholds are different from each other.

In one embodiment, each of the plurality of predetermined thresholds is a floating point number that is no less than 0 and that is no greater than 1.

In one embodiment, each of the plurality of predictive models uses different inputs to determine the likelihood of qualification for the earned income tax credit for the user.

In one embodiment, the user data includes occupation information, and the method further comprises estimating an average income for the user at least partially based on the occupation information; and including the average income for the user in the user data prior to applying the user data to the predictive model to determine the likelihood of qualification for the earned income tax credit for the user.

In one embodiment, the occupation information includes a geographic location of an occupation for the user.

In one embodiment, the occupation information includes one or more subcategories of an occupation of the user.

In one embodiment, the process further includes maintaining a data structure of average incomes for various occupations to facilitate estimating the average income for the user, wherein the data structure includes regional differences of the average incomes for the various occupations.

In one embodiment, the average incomes are periodically updated in the data structure.

In one embodiment, the user data includes personal data, income data, and, if the user is a returning user to the tax return preparation system, data indicative of whether the user qualified for the earned income tax credit in a previous year.

In one embodiment, the predictive model has an output that is a floating point number that is no less than 0 and that is no greater than 1.

In one embodiment, the predictive model has operating characteristics that include a true positive rate, a false negative rate, a false positive rate, and a true negative rate.

In one embodiment, the process 500 further comprises training the predictive model with existing tax data collected by the tax return preparation system during one or more previous tax return preparation seasons.

In one embodiment, the process further comprises adjusting the predetermined threshold to cause the tax return preparation system to operate around a predetermined operating point of an operating characteristics curve for the predictive model, wherein adjusting the threshold includes adjusting the threshold on a periodic basis during a current tax return preparation season.

In one embodiment, exceeding a predetermined threshold includes going below the predetermined threshold.

In one embodiment, exceeding a predetermined threshold includes going above the predetermined threshold.

In one embodiment, the predetermined threshold is a first threshold, and the process further includes postponing a presentation, to the user, of questions that are related to the earned income tax credit, if the likelihood of qualification for the earned income tax credit for the user is above or below a second threshold, to reduce a duration the tax return preparation session.

As noted above, the specific illustrative examples discussed above are but illustrative examples of implementations of embodiments of the method or process for improving retention of a user of a tax return preparation system. Those of skill in the art will readily recognize that other implementations and embodiments are possible. Therefore the discussion above should not be construed as a limitation on the claims provided below.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various users under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating," "accessing," "adding," "aggregating," "alerting," "applying," "analyzing," "associating," "calculating," "capturing," "categorizing," "classifying," "comparing," "creating," "defining," "detecting," "determining," "distributing," "eliminating," "encrypting," "extracting," "filtering," "forwarding," "generating," "identifying," "implementing," "informing," "monitoring," "obtaining," "posting," "processing," "providing," "receiving," "requesting," "saving," "sending," "storing," "substituting," "transferring," "transforming," "transmitting," "using," etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for applying analytics models to a tax return preparation system to determine a likelihood of qualification for an earned income tax credit by a user, comprising:
    receiving, with a computing system, user data that is associated with a user;
    selecting and employing a particular predictive module of a plurality of predictive modules, the selection of the particular predictive module being based on which components of a plurality of possible user data components were received, each predictive module having different thresholds regarding a likelihood of qualification of an earned income tax credit;
    applying, with the computing system, the user data to a predictive model to cause the predictive model to determine, at least partially based on the user data, a likelihood of qualification for an earned income tax credit for the user;
    displaying, for the user, an estimated tax return benefit to the user, at least partially based on the likelihood of qualification for the earned income tax credit exceeding a predetermined threshold, to reduce delays in presenting estimated earned income tax credit benefits to the user during a tax return preparation session in a tax return preparation system;
    receiving a final determination regarding whether the user qualifies for the earned income tax credit; and
    adjusting the threshold for the selected predictive module based on a predetermined level of accuracy desired and whether the predictive model likelihood of qualification for an earned income tax credit was accurate based on the final determination.

2. The method of claim 1, wherein applying the user data to the predictive model includes applying the user data to the predictive model during one of a number of sections within the tax return preparation session.

3. The method of claim 2, wherein the number of sections within the tax return preparation session include a personal information acquisition section, an occupation information acquisition section, and an income acquisition section.

4. The method of claim 1, wherein the predetermined threshold is at least partially based on a false negative rate of a receiver operating curve, the false negative rate being at least partially based on wrongly identifying users as not qualifying for the earned income tax credit.

5. The method of claim 1, wherein sections within the tax return preparation session include at least a personal information acquisition section, an occupation information acquisition section, and an income acquisition section.

6. The method of claim 5, wherein a first of the plurality of predictive models is used by the tax return preparation system during the personal information acquisition section and the first of the plurality of predictive models receives personal information as a first input,
    wherein a second of the plurality of predictive models is used by the tax return preparation system if the user enters the occupation information acquisition section and the second of the plurality of predictive models receives occupation information as a second input,
    wherein a third of the plurality of predictive models is used by the tax return preparation system if the user enters the income acquisition section and the third of the plurality of predictive models receives income information as a third input,
    wherein the first input, second input, and third input include different quantities of user information.

7. The method of claim 6, wherein the predetermined threshold is one of a plurality of predetermined thresholds for the likelihood of qualification for the earned income tax credit,
    wherein the first of the plurality of predictive models applies a first of the plurality of predetermined thresholds to determine the likelihood of qualification for the earned income tax credit,
    wherein the second of the plurality of predictive models applies a second of the plurality of predetermined thresholds to determine the likelihood of qualification for the earned income tax credit,
    wherein the third of the plurality of predictive models applies a third of the plurality of predetermined thresholds to determine the likelihood of qualification for the earned income tax credit.

8. The method of claim 7, wherein each of the first of the plurality of predetermined thresholds, the second of the plurality of predetermined thresholds, and the third of the plurality of predetermined thresholds are different from each other.

9. The method of claim 7, wherein each of the plurality of predetermined thresholds is a floating point number that is no less than 0 and that is no greater than 1.

10. The method of claim 1, wherein each of the plurality of predictive models uses different inputs to determine the likelihood of qualification for the earned income tax credit for the user.

11. The method of claim 1, wherein the user data includes occupation information, the method further comprising:
    estimating an average income for the user at least partially based on the occupation information; and
    including the average income for the user in the user data prior to applying the user data to the predictive model to determine the likelihood of qualification for the earned income tax credit for the user.

12. The method of claim 11, wherein the occupation information includes a geographic location of an occupation for the user.

13. The method of claim 11, wherein the occupation information includes one or more subcategories of an occupation of the user.

14. The method of claim 11, further comprising:
    maintaining a data structure of average incomes for various occupations to facilitate estimating the average income for the user, wherein the data structure includes regional differences of the average incomes for the various occupations.

15. The method of claim 14, wherein the average incomes are periodically updated in the data structure.

16. The method of claim 1, wherein the user data includes personal data, income data, and, if the user is a returning user to the tax return preparation system, data indicative of whether the user qualified for the earned income tax credit in a previous year.

17. The method of claim 1, wherein the user data is selected from a group of user data consisting of:
- data indicating an age of the user;
- data indicating an age of a spouse of the user;
- data indicating a zip code;
- data indicating a tax return filing status;
- data indicating state income;
- data indicating a home ownership status;
- data indicating a home rental status;
- data indicating a retirement status;
- data indicating a student status;
- data indicating an occupation of the user;
- data indicating an occupation of a spouse of the user;
- data indicating whether the user is claimed as a dependent;
- data indicating whether a spouse of the user is claimed as a dependent;
- data indicating whether another taxpayer is capable of claiming the user as a dependent;
- data indicating whether a spouse of the user is capable of being claimed as a dependent;
- data indicating salary and wages;
- data indicating taxable interest income;
- data indicating ordinary dividend income;
- data indicating qualified dividend income;
- data indicating business income;
- data indicating farm income;
- data indicating capital gains income;
- data indicating taxable pension income;
- data indicating pension income amount;
- data indicating IRA distributions;
- data indicating unemployment compensation;
- data indicating taxable IRA;
- data indicating taxable Social Security income;
- data indicating amount of Social Security income;
- data indicating amount of local state taxes paid;
- data indicating whether the user filed a previous years' federal itemized deduction;
- data indicating whether the user filed a previous years' state itemized deduction; and
- data indicating whether the user is a returning user to the tax return preparation system.

18. The method of claim 17, wherein the group of user data further consists of:
- data indicating an annual income;
- data indicating an employer's address;
- data indicating contractor income;
- data indicating a marital status;
- data indicating a medical history;
- data indicating dependents;
- data indicating assets;
- data indicating spousal information;
- data indicating children's information;
- data indicating an address;
- data indicating a name;
- data indicating a Social Security Number;
- data indicating a government identification;
- data indicating a date of birth;
- data indicating educator expenses;
- data indicating health savings account deductions;
- data indicating moving expenses;
- data indicating IRA deductions;
- data indicating student loan interest deductions;
- data indicating tuition and fees;
- data indicating medical and dental expenses;
- data indicating state and local taxes;
- data indicating real estate taxes;
- data indicating personal property tax;
- data indicating mortgage interest;
- data indicating charitable contributions;
- data indicating casualty and theft losses;
- data indicating unreimbursed employee expenses;
- data indicating an alternative minimum tax;
- data indicating a foreign tax credit;
- data indicating education tax credits;
- data indicating retirement savings contributions; and
- data indicating child tax credits.

19. The method of claim 1, wherein the predictive model has an output that is a floating point number that is no less than 0 and that is no greater than 1.

20. The method of claim 1, wherein the predictive model has operating characteristics that include a true positive rate, a false negative rate, a false positive rate, and a true negative rate.

21. The method of claim 1, further comprising:
adjusting the predetermined threshold to cause the tax return preparation system to operate around a predetermined operating point of an operating characteristics curve for the predictive model, wherein adjusting the threshold includes adjusting the threshold on a periodic basis during a current tax return preparation season.

22. The method of claim 1, wherein exceeding a predetermined threshold includes going below the predetermined threshold.

23. The method of claim 1, wherein exceeding a predetermined threshold includes going above the predetermined threshold.

24. The method of claim 1, wherein the predetermined threshold is a first threshold, the method further comprising:
postponing a presentation, to the user, of questions that are related to the earned income tax credit, if the likelihood of qualification for the earned income tax credit for the user is above or below a second threshold, to reduce a duration the tax return preparation session.

25. A system for applying analytics models to a tax return preparation system to determine a likelihood of qualification for an earned income tax credit by a user, the system comprising:
at least one processor; and
at least one memory coupled to the at least one processor, the at least one memory having stored therein instructions which, when executed by any set of the one or more processors, perform a process for applying analytics models to a tax return preparation system to determine a likelihood of qualification for an earned income tax credit by a user, the process including:
receiving, with a computing system, user data that is associated with a user;
selecting and employing a particular predictive module of a plurality of predictive modules, the selection of the particular predictive module being based on which components of a plurality of possible user data components were received, each predictive module having different thresholds regarding a likelihood of qualification of an earned income tax credit;
applying, with the computing system, the user data to a predictive model to cause the predictive model to determine, at least partially based on the user data, a likelihood of qualification for an earned income tax credit for the user;

displaying, for the user, an estimated tax return benefit to the user, at least partially based on the likelihood of qualification for the earned income tax credit exceeding a predetermined threshold, to reduce delays in presenting estimated earned income tax credit benefits to the user during a tax return preparation session in a tax return preparation system;

receiving a final determination regarding whether the user qualifies for the earned income tax credit; and adjusting the threshold for the selected predictive module based on a predetermined level of accuracy desired and whether the predictive model likelihood of qualification for an earned income tax credit was accurate based on the final determination.

\* \* \* \* \*